United States Patent
Swett et al.

(10) Patent No.: US 11,066,930 B2
(45) Date of Patent: Jul. 20, 2021

(54) SYSTEMS AND METHOD FOR ANALYZING DOWNHOLE FLUID PROPERTIES USING CO-LOCATED MULTI-MODAL SENSORS

(71) Applicant: Baker Hughes Oilfield Operations LLC, Houston, TX (US)

(72) Inventors: Dwight Swett, Houston, TX (US); Daniel Vaughn Price, Houston, TX (US); Otto Fanini, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 290 days.

(21) Appl. No.: 16/236,975

(22) Filed: Dec. 31, 2018

(65) Prior Publication Data

US 2020/0208515 A1    Jul. 2, 2020

(51) Int. Cl.
| | | |
|---|---|---|
| *G01N 29/036* | (2006.01) | |
| *G01N 29/024* | (2006.01) | |
| *E21B 47/10* | (2012.01) | |
| *E21B 47/01* | (2012.01) | |
| *E21B 49/08* | (2006.01) | |
| *G01N 9/00* | (2006.01) | |
| *G01N 29/02* | (2006.01) | |

(52) U.S. Cl.
CPC .......... *E21B 49/081* (2013.01); *G01N 9/002* (2013.01); *G01N 29/022* (2013.01); *E21B 49/0875* (2020.05); *G01N 2291/02818* (2013.01)

(58) Field of Classification Search
CPC .......... G01N 9/00; G01N 9/36; G01N 29/036; G01N 29/24; G01N 29/34; G01N 33/28; G01N 21/17; G01N 21/552; G01N 21/55; E21B 49/08; E21B 47/12; E21B 47/00; G01J 3/28

See application file for complete search history.

(56) References Cited

U.S. PATENT DOCUMENTS

| | | | |
|---|---|---|---|
| 2005/0007583 A1 | 1/2005 | DiFoggio | |
| 2005/0182566 A1 | 8/2005 | DiFoggio | |
| 2005/0279498 A1* | 12/2005 | Nakajima | ........... E21B 17/1021 166/255.2 |
| 2007/0017291 A1 | 1/2007 | Cypes et al. | |

(Continued)

OTHER PUBLICATIONS

International Search Report and Written Opinion dated Mar. 18, 2020 in International Application No. PCT/US19/69124.

(Continued)

*Primary Examiner* — Brandi N Hopkins
(74) *Attorney, Agent, or Firm* — Hogan Lovells US LLP

(57) ABSTRACT

A downhole fluid analysis device includes a piezoelectric helm resonator, an optical sensor, and an electromagnetic spectroscopy sensor. The piezoelectric helm resonator includes a strain bar and a pair of electrodes coupled to opposite sides of the strain bar. The piezoelectric helm resonator further includes a pair of tines, in which a first tine of the pair of tines is coupled to opposite ends of the strain bar, the pair of tines each having an arc, and such that strain across a transverse face of the strain bar generates a resonance response from the pair of tines. The optical sensor is positioned centrally with respect to the piezoelectric helm resonator, and the spectroscopy sensor is positioned symmetrically with respect to the piezoelectric helm resonator in at least on direction.

20 Claims, 11 Drawing Sheets

(56) References Cited

U.S. PATENT DOCUMENTS

| | | |
|---|---|---|
| 2012/0166157 A1 | 6/2012 | Whittaker |
| 2013/0134981 A1 | 5/2013 | Liu et al. |
| 2014/0062487 A1 | 3/2014 | Bloemendamp |
| 2016/0326866 A1* | 11/2016 | Swett .................... E21B 49/087 |
| 2016/0341029 A1 | 11/2016 | Phillips et al. |
| 2017/0038491 A1 | 2/2017 | Gonzalez et al. |
| 2017/0051606 A1 | 2/2017 | Fanini |
| 2017/0335682 A1 | 11/2017 | Clark |

OTHER PUBLICATIONS

International Search Report and Written Opinion dated Mar. 19, 2020 in International Application No. PCT/US19/69126.

Joe Wolfe, "Helmholtz Resonance," The University New South Wales, School of Physics, https://newt.phys.unsw.edu.au/jw/Helmholtz.html.

Schlumberger Limited, "RSTPro Reservoir Saturation Tool," 2018, https://www.slb.com/services/production/production_logging/reservoir_saturation_tool.aspx.

International Search Report and Written Opinion dated Apr. 1, 2020 in corresponding PCT Application No. PCT/US19/69127.

* cited by examiner

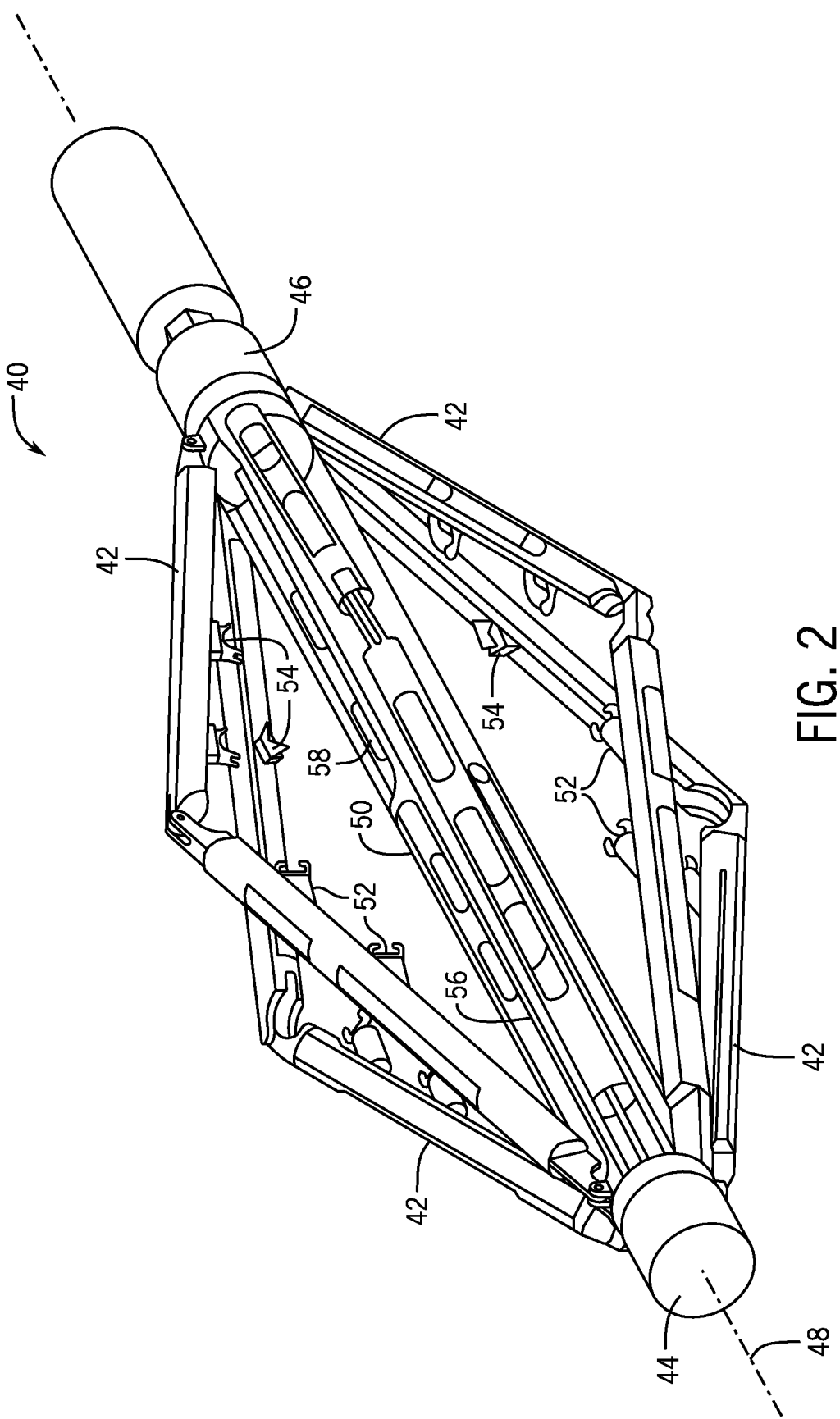

SYSTEMS AND METHOD FOR ANALYZING DOWNHOLE FLUID PROPERTIES USING CO-LOCATED MULTI-MODAL SENSORS

BACKGROUND

1. Field of the Invention

The present disclosure relates to downhole measurements. More particularly, the present disclosure relates to obtaining a number of properties of the fluid inside a wellbore.

2. Description of Related Art

During oil and gas operations, it is often difficult to determine fluid properties in a downhole well due to inaccessibility, contamination of fluids, mixing of fluids, and the like. As a result, typical operations deploy multiple tools that may be specialized to determine a single fluid property, such as density. These tools are often fragile, and as a result, may not be utilized in multiple operations. Furthermore, installing multiple tools along a drill or wireline string increases costs of the operation and also may lead to slower drilling and or wireline logging operations because some tools are individually tripped into and out of the well.

SUMMARY

Applicants recognized the problems noted above herein and conceived and developed embodiments of systems and methods, according to the present disclosure, for a multi-modal sensing and identification of fluid properties.

In an embodiment, a downhole fluid analysis device with multi-physics collocated measurements includes a piezoelectric helm resonator, an optical sensor, a fluid electrical impedance (capacitance) sensor, a fluid temperature sensor, and an electromagnetic (EM) spectroscopy sensor. The plurality of collocated multi-physics fluid sensors may help improve the identification resolution of the multi-phase fluids flowing in the production environment. These collocated multi-physics fluid sensors can be distributed in multiple observation points of the fluid flow tubular pipe cross-section to improve multi-phase flow monitoring and measurement coverage. The piezoelectric helm resonator includes a strain bar comprising a first side, a second side opposite the first side, a first end, and a second end opposite the first end.

The piezoelectric helm resonator further includes a pair of electrodes, in which a first electrode of the pair of electrodes is positioned on the first side and a second electrode of the pair of electrodes is positioned on the second side. The piezoelectric helm resonator further includes a pair of tines, in which a first tine of the pair of tines is coupled to the first end and a second tine of the pair of tines is coupled to the second end, the pair of tines each having an arc, and such that strain across a transverse face of the strain bar generates a resonance response from the pair of tines. The optical sensor is positioned centrally with respect to the piezoelectric helm resonator, and the spectroscopy sensor is positioned symmetrically with respect to the piezoelectric helm resonator in at least one direction. Although illustrated as positioned centrally in the present embodiment, the optical sensor does not have to be positioned centrally, and may be positioned differently in other embodiments.

The fluid electrical impedance sensor is exposed to the fluid and detects the fluid capacitance whose measurements are dependent on the fluid relative permittivity (i.e., dielectric constant). The fluid capacitance measurement may generally be higher for higher relative permittivity fluids (e.g. water with $\varepsilon_w=80$), and lower for lower relative permittivity fluids (e.g., oil with $\varepsilon_{oil}=2.2$ or air with $\varepsilon_{air}=1$). Thus, the fluid capacitance measurement can be indicative of the type of fluid present.

The fluid temperature sensor may be a resistance temperature detector (RTD), or optionally including a silicon-based MEMS (micro-electro-mechanical) chip, for example. The fluid temperature sensor can provide fluid measurement calibration data and complementary thermal conditions of the fluid, which may affect the density, sonic speed, viscosity, and piezoelectric helm resonator measurements. The RTD can also provide additional measurements acting as a thermal mass flow meter. The thermal mass flow measurements may be based on the thermal dispersion. An immersible mass flow meter design can measure fluid mass flow rate by means of the heat convected from a heated surface and measuring the temperature of the flowing fluid over time.

In another embodiments, a downhole fluid analysis system includes a plurality of arms movable from a retracted position into an expanded position, each arm comprising one or more fluid sensors. At least one of the fluid sensors includes a piezoelectric helm resonator, an optical sensor, and a spectroscopy sensor. The piezoelectric helm resonator includes a strain bar comprising a first side, a second side opposite the first side, a first end, and a second end opposite the first end. The piezoelectric helm resonator further includes a pair of electrodes, in which a first electrode of the pair of electrodes is positioned on the first side and a second electrode of the pair of electrodes is positioned on the second side. The piezoelectric helm resonator further includes a pair of tines, in which a first tine of the pair of tines is coupled to the first end and a second tine of the pair of tines is coupled to the second end, the pair of tines each having an arc, and such that strain across a transverse face of the strain bar generates a resonance response from the pair of tines. The optical sensor is positioned centrally with respect to the piezoelectric helm resonator, and the spectroscopy sensor is positioned symmetrically with respect to the piezoelectric helm resonator in at least one direction.

In another embodiments, a method of obtaining fluid properties in a well includes positioning a fluid sensor in a wellbore, in which the fluid sensor comprising co-located piezoelectric helm resonator, optical sensor and spectroscopy sensor. The method further includes applying electrical energy to the piezoelectric helm resonator to excite the piezoelectric helm resonator, receiving a first signal from the piezoelectric helm resonator, and determining one or more of density, viscosity, or sound speed of a region of fluid in the wellbore based at least in part the one or more signals from the piezoelectric helm resonator. The method also includes receiving a second signal from the optical sensor, determining one or more optical properties of the region of fluid based at least in part on the second signal, receiving a third signal from the spectroscopy sensor, and determining one or more spectroscopy characteristics of the region of fluid based at least in part on the third signal.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 2 illustrates a perspective view of a fluid analysis tool in an expanded position, in accordance with example embodiments.

DETAILED DESCRIPTION

Figure 1:
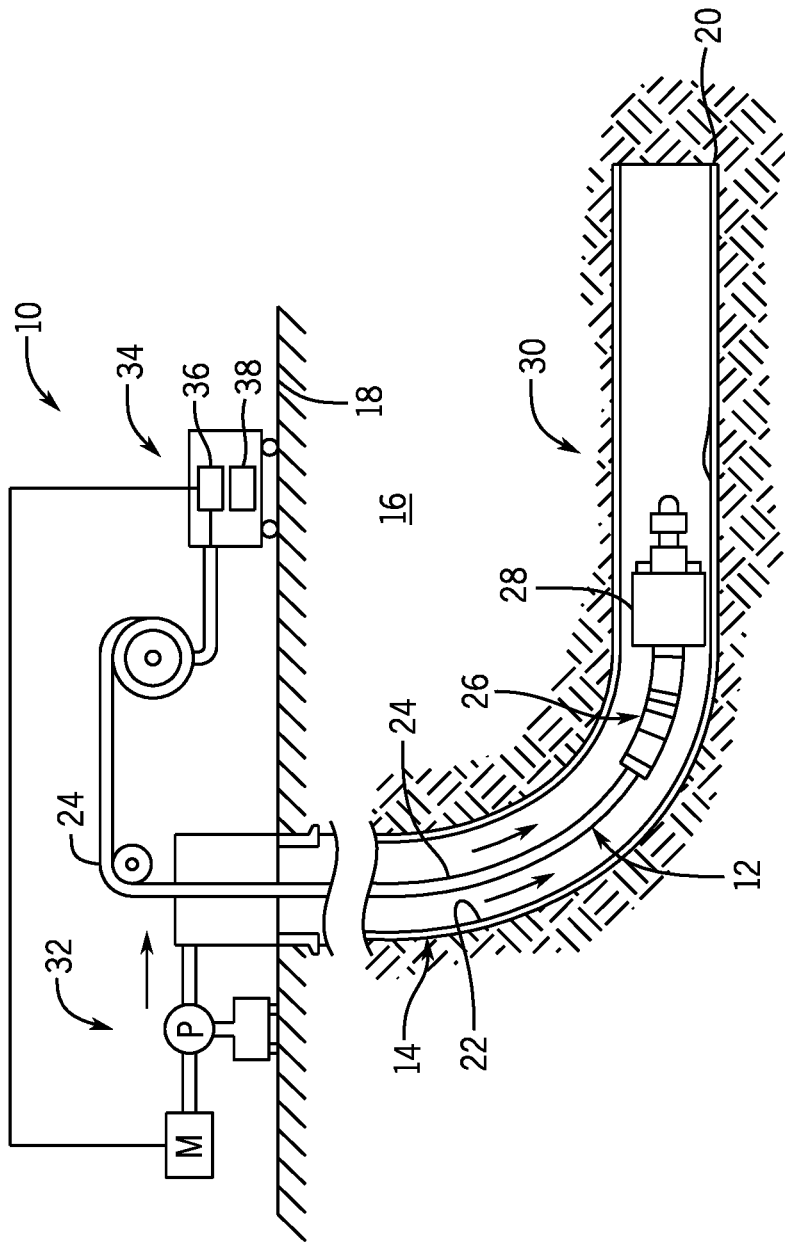
FIG. 1 is a schematic side view of an embodiment of a wireline system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure provide a piezoelectric helm resonator sensor array having simultaneous and mathematically congruent fluid density, viscosity, and sound speed measurements as well as integrated electromagnetic and optical spectroscopy characterization. Acoustic measurements are important in determining composition and chemical properties of unknown multi-phase fluids for applications in a variety of fields. Current devices and methods, such as those for measuring either fluid density or fluid sound speed rely on an a priori knowledge of the mass density of the continuous and dispersed phases of the flow, and are primarily for surface separation systems. However, existing approaches are not applicable to in situ downhole applications since the mass densities of the components of the flow are not generally known and are only estimable from surface "dead oil" properties that do not account for effects such as downhole pressure, temperature, and gas-saturation. Fluid optical properties and characteristics can be derived downhole from some of the following optical measurement techniques: reflectance, emittance, transmittance, absorbance, fluorescence, optical spectroscopy, refractive index dependent optical measurements, and others techniques known in the optical instrumentation art.

Embodiments of the present disclosure provide techniques (e.g., devices, systems, tools, methods) that allow multi-phase fluid properties (e.g., volume fractions, gas-oil-ratio, live-oil density, live-oil sound speed, and live-oil compressibility) to be determined from the direction measureable composite fluid acoustic properties of sound speed, bulk modulus and acoustic impedance. In order to make these correlations the measurements for sound speed, acoustic impedance and bulk modulus of the composite fluid flow must be obtained in a specific congruent manner. That is, from a single measurement domain [M-domain] with a sensing field of interaction that is simultaneous and congruent relative to all the acoustic measurements and all the continuous/dispersed particles.

Many factors present difficulty to the development of sensor technologies capable of these types of acoustic compositional measurements. Most important of these is the necessity for simultaneous and congruent measurements with respect to each other, thus providing a true measure of the bulk composite fluid density and sound speed that have correlations with compositional and chemical properties of the bulk fluid from the same volumetric sample within the sample zone measured. Existing approaches utilize two separate measurements of two non-identical fluid domains, for example M1-domain and M2-domain, to obtain measurements for fluid sound speed c1 in M1-domain and fluid mass density $\rho 2$ in M2-domain. In general no correlation can be shown to exist between the sound speeds and/or the mass densities of the two domains except in random occurrences.

In order to examine the correlations that may exist between the various compositional properties of liquid-liquid flows and the bulk fluid acoustic properties of the mixtures, an ideal acoustic impedance sensor that can measure simultaneously and congruently fluid density and sound speed properties is needed. Further, it is tacitly required that the sensor measurement attained provide delineated bulk fluid properties estimates of mass density and sound speed that can be discriminated directly from the measurement without any a priori knowledge of or assumption with regard to elemental properties of the bulk composite fluid. Embodiments of the present disclosure provide a piezoelectric helm resonator sensor array having simultaneous and mathematically congruent fluid density, viscosity, and sound speed measurements as well as integrated electromagnetic and optical spectroscopy characterization.

FIG. 1 is a schematic elevation view of an embodiment of a wellbore system 10 that includes a work string 12 shown conveyed in a wellbore 14 formed in a formation 16 from a surface location 18 to a depth 20. The wellbore 14 is shown lined with a casing 22, however it should be appreciated that in other embodiments the wellbore 14 may not be cased. In various embodiments, the work string 12 includes a conveying member 24, such as an electric wireline, and a downhole tool or assembly 26 (also referred to as the bottomhole assembly or "BHA") attached to the bottom end of the wireline. The illustrated downhole assembly 26 includes various tools, sensors, measurement devices, communication devices, and the like, which will not all be described for clarity. In various embodiments, the downhole assembly 26 includes a measurement module 28, which will be described below, determining one or more properties of the formation 16. In the illustrated embodiment, the downhole tool 28 is arranged in a horizontal or deviated portion 30 of the wellbore 14, however it should be appreciated that the downhole tool 28 may also be deployed in substantially vertical segments of the wellbore 14.

The illustrated embodiment further includes a fluid pumping system 32 at the surface 18 that includes a motor that drives a pump to pump a fluid from a source into the wellbore 14 via a supply line or conduit. To control the rate of travel of the downhole assembly, tension on the wireline 14 is controlled at a winch on the surface. Thus, the combination of the fluid flow rate and the tension on the wireline may contribute to the travel rate or rate of penetration of the downhole assembly 16 into the wellbore 14. The wireline 14 may be an armored cable that includes conductors for supplying electrical energy (power) to downhole devices and communication links for providing two-way communication between the downhole tool and surface devices. In aspects, a controller 34 at the surface is provided to control the operation of the pump and the winch to control the fluid flow rate into the wellbore and the tension on the wireline 12. In aspects, the controller 34 may be a computer-based system that may include a processor 36, such as a microprocessor, a storage device 38, such as a memory device, and programs and instructions, accessible to the processor for executing the instructions utilizing the data stored in the memory 38.

As described above, the illustrated embodiment includes the measurement module 28. As will be described below, in various embodiments, the measurement module 28 may include one or more piezoelectric helm resonators for determination of various fluid properties within the wellbore 14. For example, oil and gas products may enter an annulus and flow along the BHA 26. At least a portion of that flow may be redirected into the measurement module 28. Within the measurement module 28, or proximate the measurement module 28 in certain embodiments, one or more fluid properties may be measured to facilitate wellbore operations. Furthermore, it should be appreciated that while various embodiments include the measurement module 28 incorporated into a wireline system, in other embodiments the measurement module 28 may be associated with rigid drill pipe, coiled tubing, or any other downhole exploration and production method.

In some embodiments, the measurement module 28 includes a fluid analysis tool. FIG. 2 illustrates a perspective view of a fluid analysis tool 40 in an expanded position, in accordance with example embodiments. As illustrated, in some embodiments, the fluid analysis tool 40 includes a plurality of arms 42 movable from a retracted position into an expanded position. In some embodiments, the plurality of arms 42 are fixed at opposing ends 44, 46 and bendable at least one location (e.g., pivot) between the opposing ends 44, 46. The plurality of arms 42 are arranged about a central axis 48 of the system, such that the plurality of arms 42 expand away from the central axis 48 to move into the expanded position and contract towards the central axis 48 to position into the retracted position. In some embodiments, the tool may include a central body 50 substantially align with the central axis 48. The central body 50 may be configured to receive or store the plurality of arms 42 in the retracted position. In some embodiments, the central body 50 may include recessed portions 56 for receiving the arms and may include additionally recessed portions 58 for receiving the fluid sensors and/or flow spinners on the arms.

In some embodiments, each of the plurality of arms 42 includes one or more fluid sensors 52 coupled thereto. At least one of the fluid sensors 52 includes a piezoelectric helm resonator, an optical sensor, and a spectroscopy sensor. As will be discussed in further detail below, the piezoelectric helm resonator includes a strain bar comprising a first side, a second side opposite the first side, a first end, and a second end opposite the first end. The piezoelectric helm resonator further includes a pair of electrodes, in which a first electrode of the pair of electrodes is positioned on the first side and a second electrode of the pair of electrodes is positioned on the second side. The piezoelectric helm resonator further includes a pair of tines, in which a first tine of the pair of tines is coupled to the first end and a second tine of the pair of tines is coupled to the second end, the pair of tines each having an arc, and such that strain across a transverse face of the strain bar generates a resonance response from the pair of tines. The optical sensor is positioned centrally with respect to the piezoelectric helm resonator, and the spectroscopy sensor is positioned symmetrically with respect to the piezoelectric helm resonator in at least on direction.

There may be a plurality of fluid sensors 52 on each arm, as illustrated in FIG. 2, and thus a plurality of fluid sensors 52 on the tool 40. The plurality of fluid sensors 52 may be the same type of device or multiple types of devices. The fluid sensors 52 are individually addressable, such that the data obtained from each fluid sensor 52 can be associated with the respective sensor. Since each fluid sensor 52 is in a different position and thus different location in the wellbore, the data from each fluid sensor 52 can be associated with a specific location in the wellbore.

The fluid sensors 52 may be coupled to the respective arm 42 via a pivot and configured to swing inwardly away from the respective arm 42 towards a central axis 48 or central body 50 of the tool 40. Alternatively, in some embodiments, the fluid sensors 52 may be configured to swing outward away from the respective arm 42 and away from the central body 50 or to the side in a direction tangential to a central axis 48 of the tool 40. The fluid sensors 52 may be movable from a stored position to a deployed position relative to the respective arm 42 on which a fluid sensor 52 is located. In the stored position, the fluid sensors 52 may be stored in the arms 42. In the deployed position, the fluid sensors 52 are extended out from the arms 42 and positioned substantially parallel to the axis of the borehole. In some embodiments, the fluid sensors 52 are at an angle within certain degrees from an axis of a borehole in which the system is positioned. Thus, the fluid sensors 52 are positioned to substantially face the direction of fluid flow through the borehole. In some embodiments, at least one of the plurality of arms 42 comprises a flow spinner 54 located thereon to direct the fluid flow for alignment with the fluid sensors 52.

In the illustrated example embodiments, the tool includes six arms 42, with two fluid sensors 52 and two spinners 54 integrated into each arm 42. The sensors 52 and spinners 54 may each be articulated with a four-bar mechanism that compensates for the deployment angle of the array arms 42 to maintain the sensors 52 and spinners 54 to within ±5 degrees orientation to the borehole axis regardless of the arm's deployment angle, as illustrated below with respect to FIGS. 3A, 3B, and 3C. The four-bar mechanisms may also nest the sensor\spinner array in the tool chassis pockets upon array retraction. Other pivoting or positioning mechanism may be employed to achieve the same or similar movement dynamics.

Figure 3A:
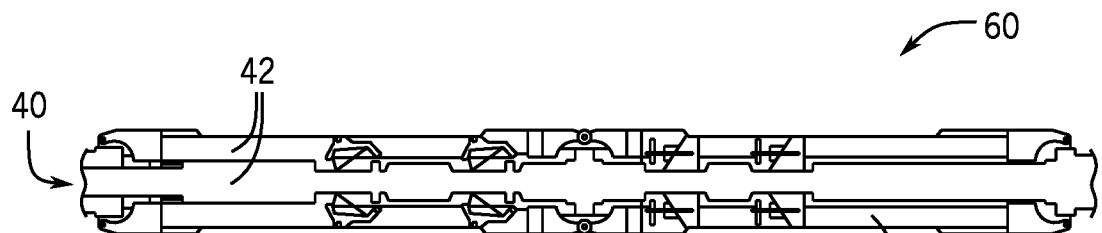
FIG. 3A illustrates the fluid analysis tool in the retracted position, in accordance with example embodiments.

FIG. 3A illustrates the fluid analysis tool in the retracted position 60, in accordance with example embodiments. As mentioned, in some embodiments, the plurality of arms 42 are arranged about a central body 50 (FIG. 2) of the tool 40. The central body 50 may be configured to receive or store the plurality of arms 42 in the retracted position. Each of the arms 42 may be the same length as the receiving portion of the central body 50 such that each arm 42 may be substantially flush against the central body 50, creating the minimum circumference of the tool 40. The fluid analysis tool may be lowered downhole in the contracted position and then deployed into an expanded position.

Figure 3B:
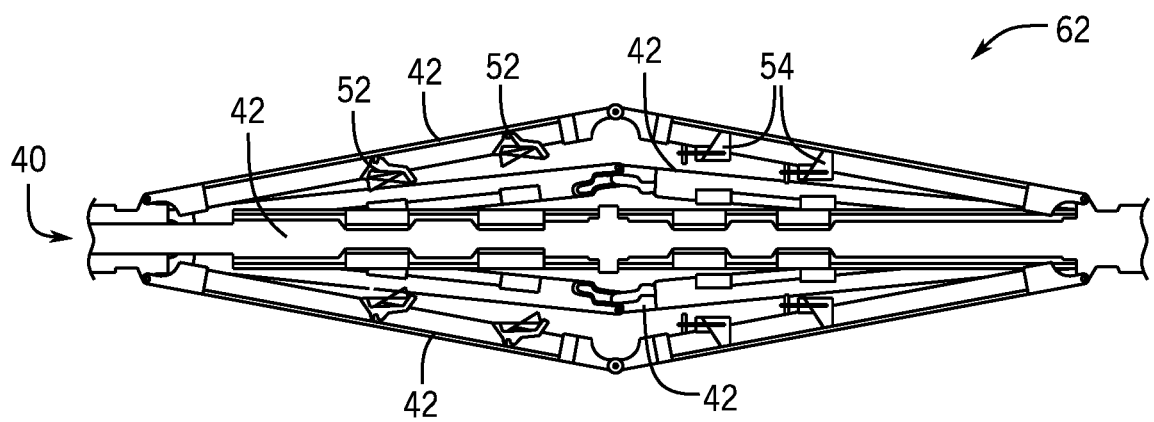
FIG. 3B illustrates the fluid analysis tool in a first expanded position, in accordance with example embodiments.
Figure 3C:
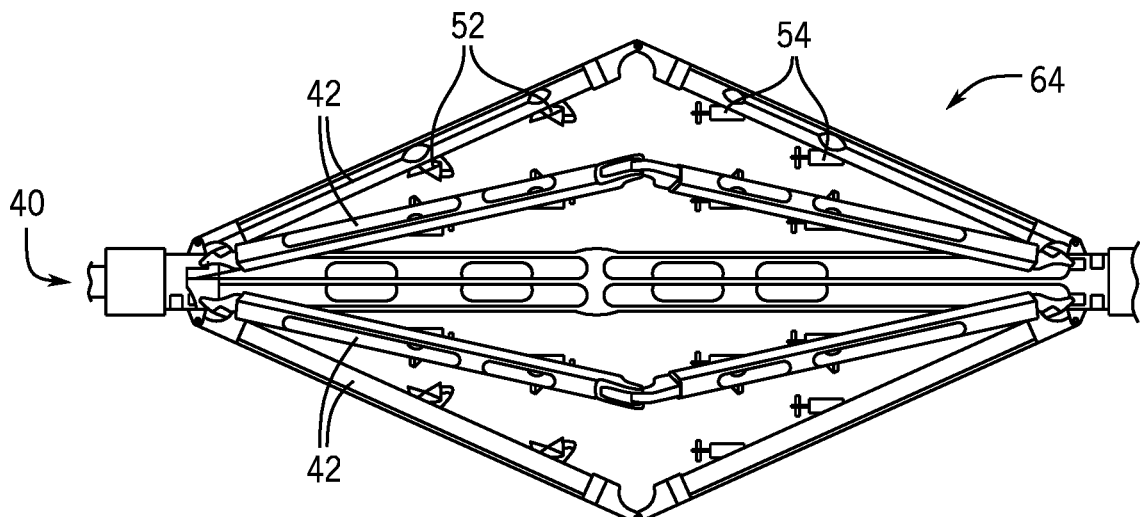
FIG. 3C illustrates the fluid analysis tool in a second expanded position, in accordance with example embodiments.

FIG. 3B illustrates the fluid analysis tool 40 in a first expanded position 62, in accordance with example embodiments. For example, this position may be used for deployment in a 5" casing. As illustrated, in the first expanded position 62, each of the arms 42 bends outward, putting the arms 42 at an angle with respect to the central body 50. The fluid sensors 52 and flow spinners 54 are also deployed out from the arms 42 at an angle from the respective arm 42. FIG. 3C illustrates the fluid analysis tool in a second expanded position 64, in which the arms 42 expand further outward than in the first expanded position 62. For example, this position may be used for deployment in a 10" casing. Similar to the first expanded position 62, in the second expanded position 64, each of the arms 42 bends outward at an angle and the fluid sensors 52 and flow spinners 54 are deployed out from the arms 42. In the second expanded position 64, the arms 42 are at a larger angle from the central body 50. However, the fluid sensors 52 and flow spinners 54 also deploy at a larger angle from the arms 42, compensating for the larger angle between the arms 42 and the central body 50. Thus, the fluid sensors 52 and flow spinners 54 are maintained at a minimal angle from the central body 50 or central axis 48 of the tool 40. As mentioned, the tool 40 may be designed to maintain the fluid sensors 52 and flow spinners 54 within ±5 degrees orientation to the borehole axis.

Figure 4:
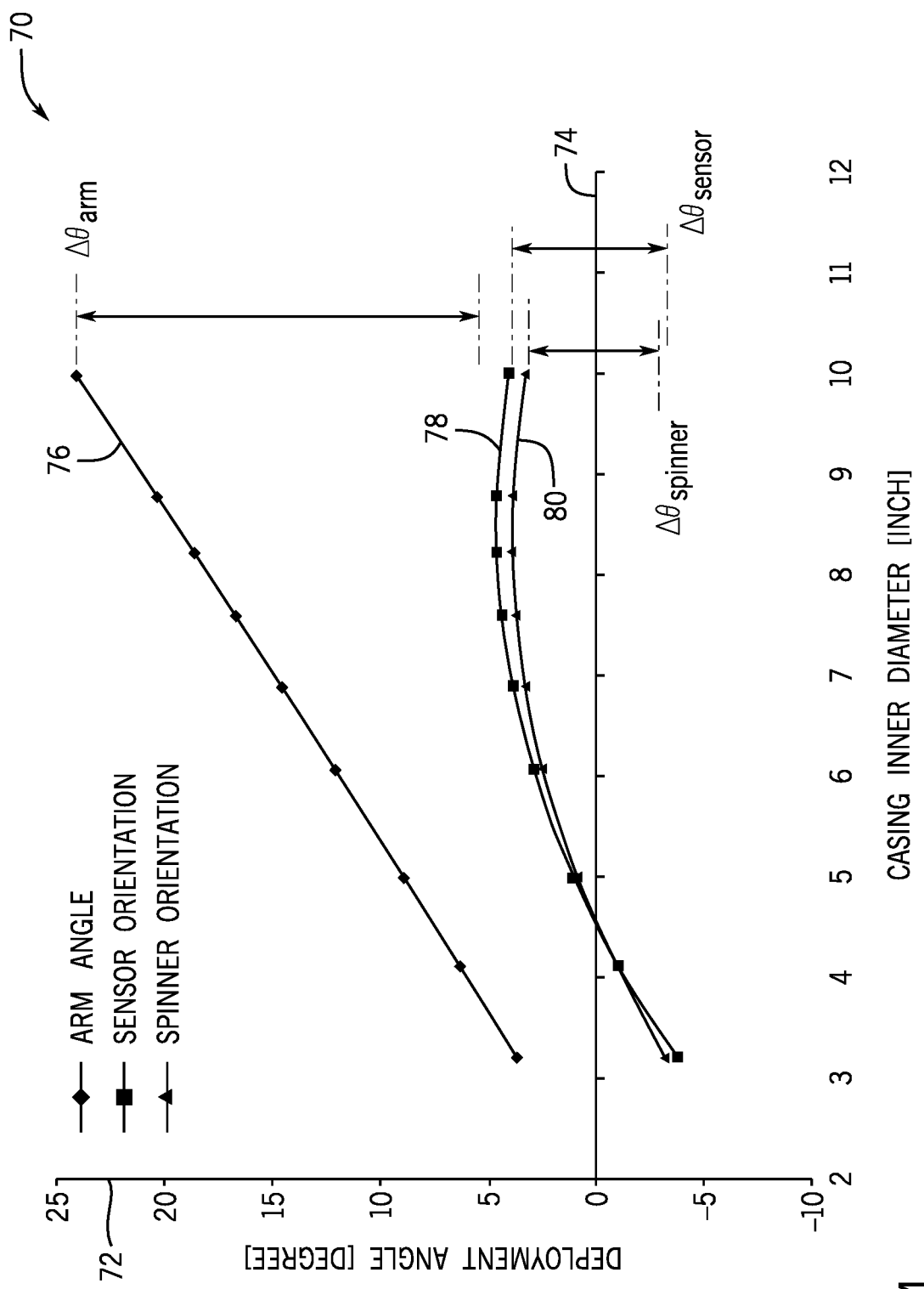
FIG. 4 is a graph illustrating the deployment angles of the arms, the fluid sensors, and the flow spinners with respect to the casing inner diameter, in accordance with example embodiments.

FIG. 4 is a graph 70 illustrating the deployment angles 72 of the arms 76, the fluid sensors 78, and the flow spinners 80 with respect to the casing inner diameter 74. As illustrated, the deployment angle of the arms 76 increases as the casing inner diameter 74 increases, as the arms expand further outward for larger boreholes. However, as the deployment angle of the arms 76 gets larger (i.e., tool expands further outward), the angles of the fluid sensors 78 and flow spinners 80 do not continue to increase accordingly. Rather, it stays within ±5 degrees regardless of the angle of the arms 76. Various embodiments and implementations of the tool may allow for different ranges. For example, some embodiments may be rated for ±2 degrees, ±10 degrees, etc.

Figure 5:
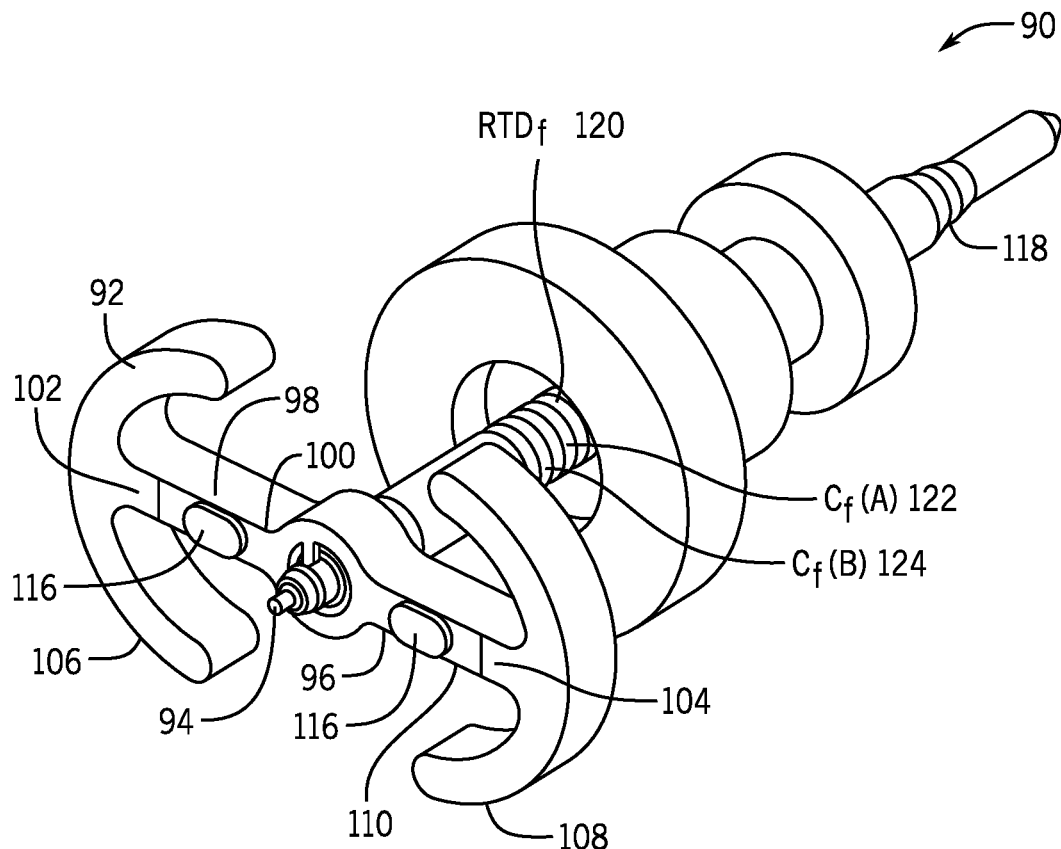
FIG. 5 illustrates a perspective view of a downhole fluid analysis device, in accordance with example embodiments.

FIG. 5 illustrates a perspective view of a downhole fluid analysis device 90, such as the fluid sensors in the fluid analysis tool of FIG. 2, in accordance with example embodiments. The downhole fluid analysis device 90 includes a piezoelectric helm resonator 92, an optical sensor 94, and a spectroscopy sensor 96. The piezoelectric helm resonator 92 includes a strain bar 98 comprising a first side 100, a second side (not in view) opposite the first side 100, a first end 102 and a second end 104 opposite the first end 102. The piezoelectric helm resonator 92 further includes a pair of tines 106, 108, in which a first tine 106 of the pair of tines is coupled to the first end 102 and a second tine 108 of the pair of tines is coupled to the second end 104. In some embodiments, the tines 106, 108 each have an arc, such that strain across a transverse face of the strain bar 98 generates a resonance response from the tines 106, 108.

It should be appreciated, and will be described further below, that the strain bar 154 may also be referred to as a Poisson strain bar and, moreover, may not have a uniform thickness across its length. That is, various portions of the straight bar 154 may be adjusted or otherwise formed in order to reduce weight, induce a certain resonance frequency, create and/or eliminate a certain sensitivity to fluid properties, and the like.

The piezoelectric helm resonator 92 further includes a pair of electrodes located thereon, in which a first electrode 110 of the pair of electrodes is positioned on the first side 100 and a second electrode (not in view) of the pair of electrodes is positioned on the second side. In some embodiments, the pair of electrodes are coupled to an electric circuit comprising a signal coupling or tuning device. The piezoelectric helm resonator receives electrical energy from the electrodes 110. In various embodiments, the electrical energy transmitted from the electrodes 110 induces a vibration within the piezoelectric helm resonator 92, for example due to resonant displacement as a result of electrodes 110 arranged on the piezoelectric helm resonator 92. This vibration may be utilized to measure one or more properties of fluid surrounding and/or flowing along the piezoelectric helm resonator 92.

In the illustrated embodiment, the piezoelectric helm resonator 92 design is based on the combination of a Poisson strain bar 98 and a symmetric pair of vibratory helm-geometry tines 106, 108. The helm tines 106, 108 are excited by placing an electrical voltage across opposing faces of the transverse thickness of the piezoelectric strain bar 98 segment to develop an oscillatory contraction/expansion of the bar thickness. Due to the Poisson's ratio effect, this through-thickness oscillatory motion develops a longitudinal oscillatory displacement along the length of the bar 92 that excites the helm tines 106, 108 into resonance response. Due to the helm geometry of the tines 106, 108, the frequency and bandwidth of the resonance response is dependent upon the visco-acoustic properties of the fluid surrounding the tines 106, 108. This characteristic can be used to determine the visco-acoustic properties of the fluid, namely fluid density, viscosity, and sound speed, from measurement of the electrical admittance spectrum (50-60 kHz) on the piezoelectric resonator driving circuit.

The optical sensor 94 is positioned centrally with respect to the piezoelectric helm resonator 92, and the spectroscopy sensor 96 is positioned symmetrically with respect to the piezoelectric helm resonator 92 in at least one direction. In some embodiments, the fluid analysis device 90 also includes a flow meter comprising a resistance thermometer detector. In some embodiments, such as in the illustrated embodiment, the spectroscopy sensor may be an electromagnetic spectroscopy sensor, in which the electromagnetic spectroscopy sensor comprises at least one electromagnetic spectroscopy coil 116 located on at least one of the pair of electrodes 110. In the illustrated embodiment, there are four coils 116 in total, with two coils 116 located on each electrode. Thus, there are two coils 116 on the first 100 side of the piezoelectric helm resonator 92 and two coils on the second side of the piezoelectric helm resonator 92. These coils 116 may develop an electromagnetic dipole field in the fluid in order to obtain an electromagnetic impedance spectroscopy for the fluid.

In some embodiments, the device 90 may include a dielectric spectroscopy sensor, in which the dielectric spectroscopy sensor includes electrodes spaced apart to allow fluid to fill a space between the electrodes. Thus, the fluid can be analyzed using dielectric spectroscopy techniques. In certain such embodiments, the spectroscopy sensor can utilizes the pair of electrodes on the piezoelectric helm resonator. For example, the pair of electrodes on the piezoelectric helm resonator may each include a portion extending into the fluid such that a portion of fluid is between the electrodes. As would be understood, in various embodiments the dielectric constants of water, rock, and oil may be used to estimate water content in a downhole formation. In various embodiments, this information may be utilized to determine the conductivity of the fluid sample. Furthermore, the conductivity may further be used, at least in part with a machine learning method, in order to provide a quantitative assessment of contamination, as will be described further below.

Dielectric assessment of materials including fluids has been shown as an effective method for electromagnetic characterization of a broad range of materials, fluids, chemical products, fluid mixes, and composites. The interaction of a material with an applied electric field can be evaluated with dielectric spectroscopy techniques. The complex relative permittivity of liquids and gases depends on the dielectric constant, loss factors, chemical composition, material physical structure, frequency and temperature. Complex dielectric permittivity includes a real component and an imaginary component. The real component of the complex dielectric permittivity is the dielectric constant and the imaginary component is the loss factor component.

Various instruments can measure complex dielectric permittivity with varying range of measurement capabilities such as impedance analyzers, scalar network analyzers, vector network analyzers (VNA), Time-Domain Reflectometry meter (TDR), and Frequency-Domain Reflectometry meter (FDR). Different instrumentation probes types are available for either reflection or transmission based measurements. For example a Fourier Transform obtained from a reflectogram of the sensor responding to an excitation pulse can provide the frequency spectrum of complex dielectric permittivity. Over the frequency range of electromagnetic spectroscopy, various physical dielectric response mechanisms of fluid materials are measured under the effect of electromagnetic fields for each frequency region. From low frequency to higher frequencies, the following fluid flow physical polarization mechanisms are activated and sensed by the electromagnetic spectroscopy probes: ionic conductivity ($10^3$ to $10^9$ Hz), dipolar ($10^7$ to $10^9$ Hz), atomic level ($10^9$ to $10^{14}$ Hz), electronic ($10^{14}$ to $10^{16}$ Hz).

The electromagnetic spectroscopy, including the electromagnetic dielectric spectroscopy of the present disclosure, includes the fluid materials' complex relative permittivity spectrum over the frequency range of interest. The electromagnetic dielectric spectroscopy can be performed over a dipolar frequency range, including the helm resonator resonating frequency range with the helm resonators' electrode probes. In some embodiments, electromagnetic dielectric spectroscopy can be performed at lower frequency range up to the frequency region of the helm resonating frequency region with an added circuit, such as the circuit illustrated in FIG. 7, which senses fluid capacitance $C_f$, which is associated with the flowing fluid dielectric permittivity. At very low frequencies the parallel complex impedance of the circuit illustrated in FIG. 7 will be dominated by the impedance of the $RTD_f$ (real component) as $C_f$ impedance will be very large in this low frequency range. $RTD_f$ can be extracted under these low frequency measurement conditions. FIG. 5 also illustrates two capacitor plates 120($C_f$-A) and 122 ($C_f$-B) from a capacitor $C_f$, which are exposed to fluid. An $RTD_f$ 124 is also exposed to fluid. In one embodiment, $RTD_f$ could be electrically isolated from the fluid by a thin thermally conductive layer applied to the sensing sensor surface exposed to the fluid.

As the measurement frequency is increased within the low frequency range, the complex impedance may show measurements sensitive to both $RTD_f$ and $C_f$. The complex impedance of $C_f$ may show sensitivity to fluid flow dielectric permittivity and also to the fluid ionic ohmic loss (heat), both of which could be resolved with multiple frequency measurements given $RTD_f$ was resolved in the very low frequency end of the measurement spectrum. There are correlation dependencies between the complex dielectric properties described here and other chemical and physical properties of the fluid flow with multiple phase components, including emulsions, surfactants, production injection additives and a variety of flow contaminants. The chemical and physical properties could include at least density, viscosity, and sonic speed. The respective correlations between such properties and the complex dielectric spectroscopy data could be processed and applied with a machine learning system to provide automated or semi-automated production fluid flow interpretation, diagnostics, analysis, and reservoir production development and flow assurance management decision making.

In some embodiments, the fluid analysis device 90 further includes a connection interface 118, such as a coaxial stab connection, for providing power and/or communication connections. The connection interface 118 may include an electrical connection coupled to the pair of electrodes 110, an acoustic channel for the piezoelectric helm resonator 92, and an optical channel for the optical sensor 112. In some embodiments, the interface 118 may include a channel coupled to and shared by the piezoelectric helm resonator 92 and the spectroscopy sensor 114, in which the channel carries an acoustic signal generated by the piezoelectric helm resonator 92 and an electrical signal generated by the spectroscopy sensor 114. The connection interface 118 may couple to fluid analysis device 90 to a cable so that power can be delivered to the fluid analysis device 90 and data can be transmitted from the fluid analysis device 90 to a controller or control station. The cable may be a coaxial cable with concentric feedthrough. The coaxial cable may include a center core fiber for carrying optical data. The cable may include concentric coaxial conductor having cylindrical geometry or helical geometry. The connection interface 118 may be configured to be compatible with various different types of cables.

Figure 6:
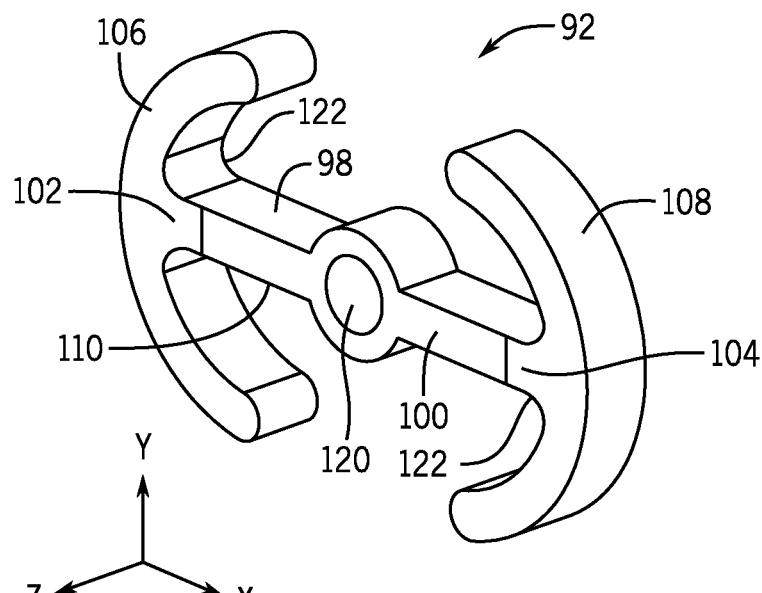
FIG. 6 illustrates a perspective view of the piezoelectric helm resonator of the downhole fluid analysis device, in accordance with example embodiments.

FIG. 6 illustrates a perspective view of the piezoelectric helm resonator 92, in accordance with example embodiments. As mentioned, the piezoelectric helm resonator 92 includes a strain bar 98 comprising a first side 100, a second side (not in view) opposite the first side, a first end 102, and a second end 104 opposite the first end 102. In various embodiments, a fillet 122 or other connection is positioned between the strain bar 98 and the tines 106, 108. As illustrated, the fillet 122 is curved, which reduces stresses between the strain bar 98 and the tines 106, 108. The piezoelectric helm resonator 92 further includes a pair of electrodes, in which a first electrode 110 of the pair of electrodes is positioned on the first side 100 and a second electrode (not in view) of the pair of electrodes is positioned on the second side opposite the first side 100. In some embodiments, an optical port 120 or orifice is formed through the center of the strain bar 98 such that the optical sensor 94 (FIG. 5) can extend therethrough or at least provide a sensing window for the optical sensor 94.

Figure 7:
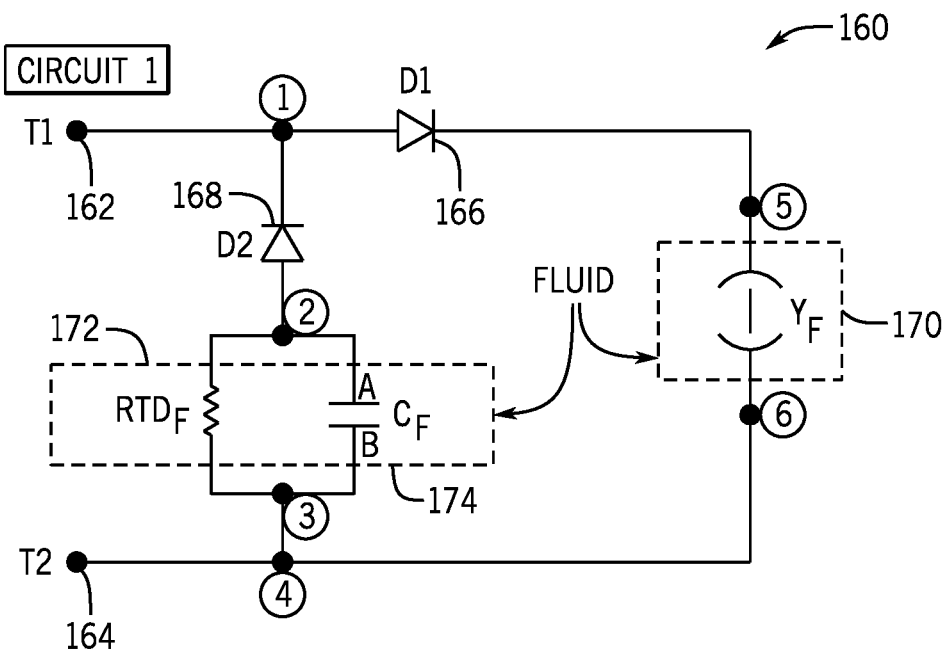
FIG. 7 illustrates an example circuit that can be used with embodiments of the present disclosure.
Figure 8:
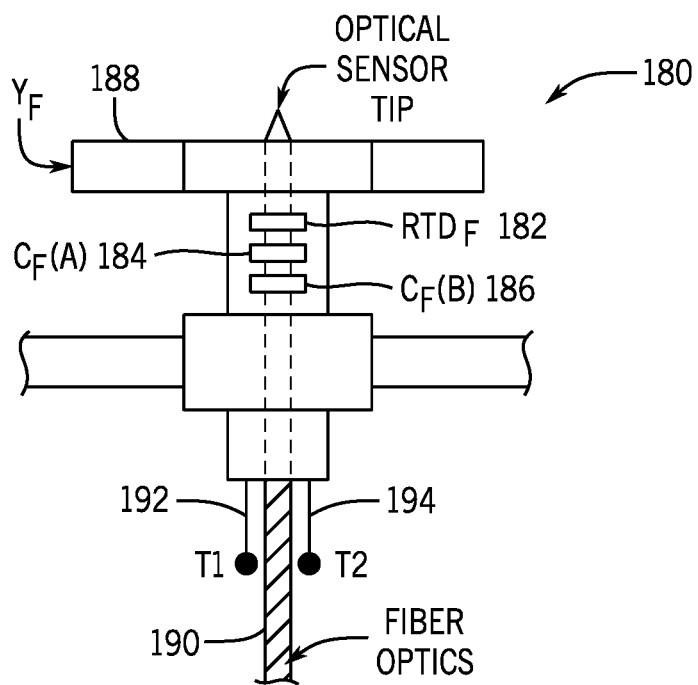
FIG. 8 illustrates a cross-sectional diagram view of the sensor of FIG. 5, in accordance with example embodiments.

FIG. 7 illustrates an example circuit 160 that can be used with embodiments of the present disclosure. The circuit 160 includes some electric circuit components, including diodes D1 166 and D2 168, which may be embedded in the multi-sensor assembly 90 of FIG. 5 in order for the several sensor measurements to be performed over two wires. As illustrated, the resonator 170 is connected in parallel with the $RTD_f$ 172 and capacitor $C_f$ 174. Other electrical circuit embodiments to enable multiple sensor measurements over two wires could involve MOSFET's switching, relay, selective frequency dependence circuits, Zener diode, etc. These two wires are routed to the deployment arm mount in the tool assembly 40 of FIG. 2, connecting to circuit terminals T1 162 and T2 164 via a pressure bulkhead feed through. FIG. 8 illustrates a cross-sectional diagram view 180 of the sensor of FIG. 5, in accordance with example embodiments. As illustrates, the $RTD_f$ 182 and capacitor plates 184, 186 are located on the sensor and exposed to the fluid. Wires 192, 194 extend into the sensor, coupling to the $RTD_f$ 182 and capacitor plates 184, 186, as well as the resonator 188. The wires 192, 194, along with the optical channel 190, extend out of the sensor, forming a connection interface.

Figure 9:
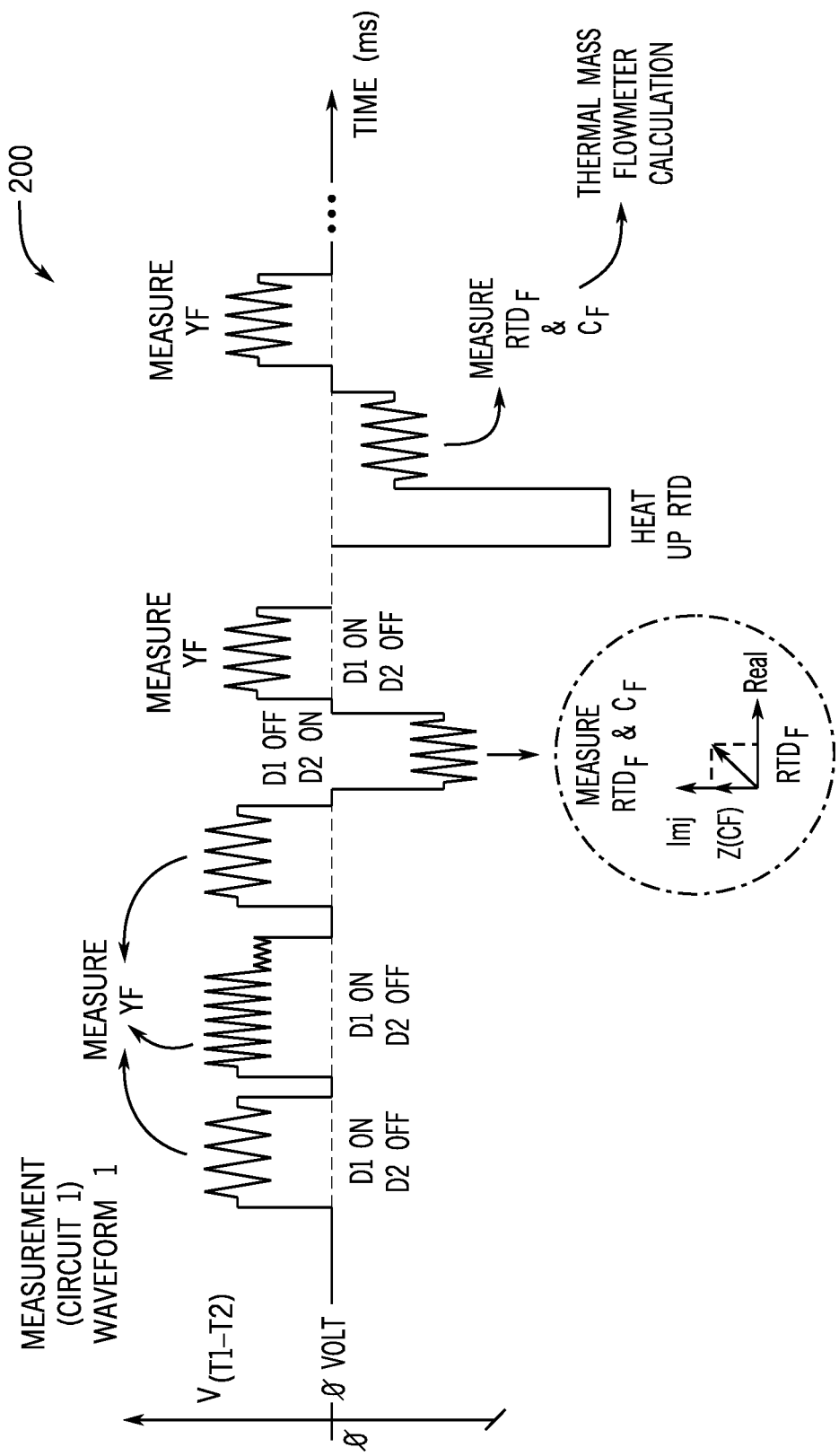
FIG. 9 illustrates an example waveform associated with operation of the circuit of FIG. 7, in accordance with example embodiments.

FIG. 9 illustrates an example waveform 200 associated with operation of the circuit of FIG. 7. When the voltage terminal T1 with respect to terminal voltage T2 is negative, diode D1 is OFF and diode D2 is ON. In this diode ON-OFF bias condition, the measurements across terminals T1 and T2 of complex impedance of respective fluid sensors $RTD_f$ and $C_f$ are performed over a frequency range. The parallel complex impedance (i.e., amplitude and phase) of fluid sensor resistor $RTD_f$ in parallel with fluid capacitance $C_f$ is evaluated over a frequency range. $RTD_f$ can be separately evaluated in the real component of the complex impedance vector and $C_f$ can also be separately evaluated in the imaginary component of the complex impedance vector.

When the voltage terminal T1 with respect to terminal voltage T2 is positive, diode D1 is ON and diode D2 is OFF. In this diode ON-OFF bias condition, the measurements across terminals T1 and T2 of complex impedance of the helm resonator is evaluated over a frequency range of interest (e.g. amplitude and phase). Measurements of complex impedance for Helm Resonators provide sensor data for fluid density, viscosity and sonic speed determination. Shown in FIG. 5 are elements for $RTD_f$, $C_f$ ($C_f$-A and $C_f$-B capacitor plates) and Helm resonators which are embedded in the multiple-sensor pressure feedthrough assembly 90 and their elements are exposed to the fluid to perform fluid sensing functions. Circuit components D1 and D2 are also mounted in the multiple-sensor pressure feedthrough assembly but are not exposed to and not in contact with the fluid but are protected from the surrounding fluid(s) and respective pressure.

Figure 10:
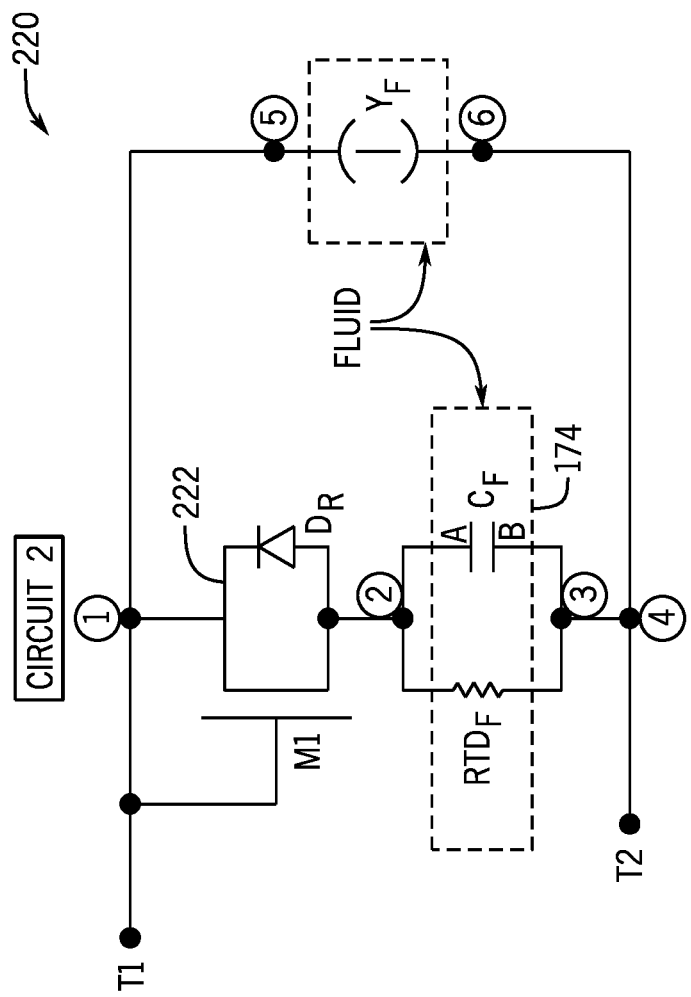
FIG. 10 illustrates another example embodiment of a circuit that can be used with embodiments of the present disclosure.
Figure 11:
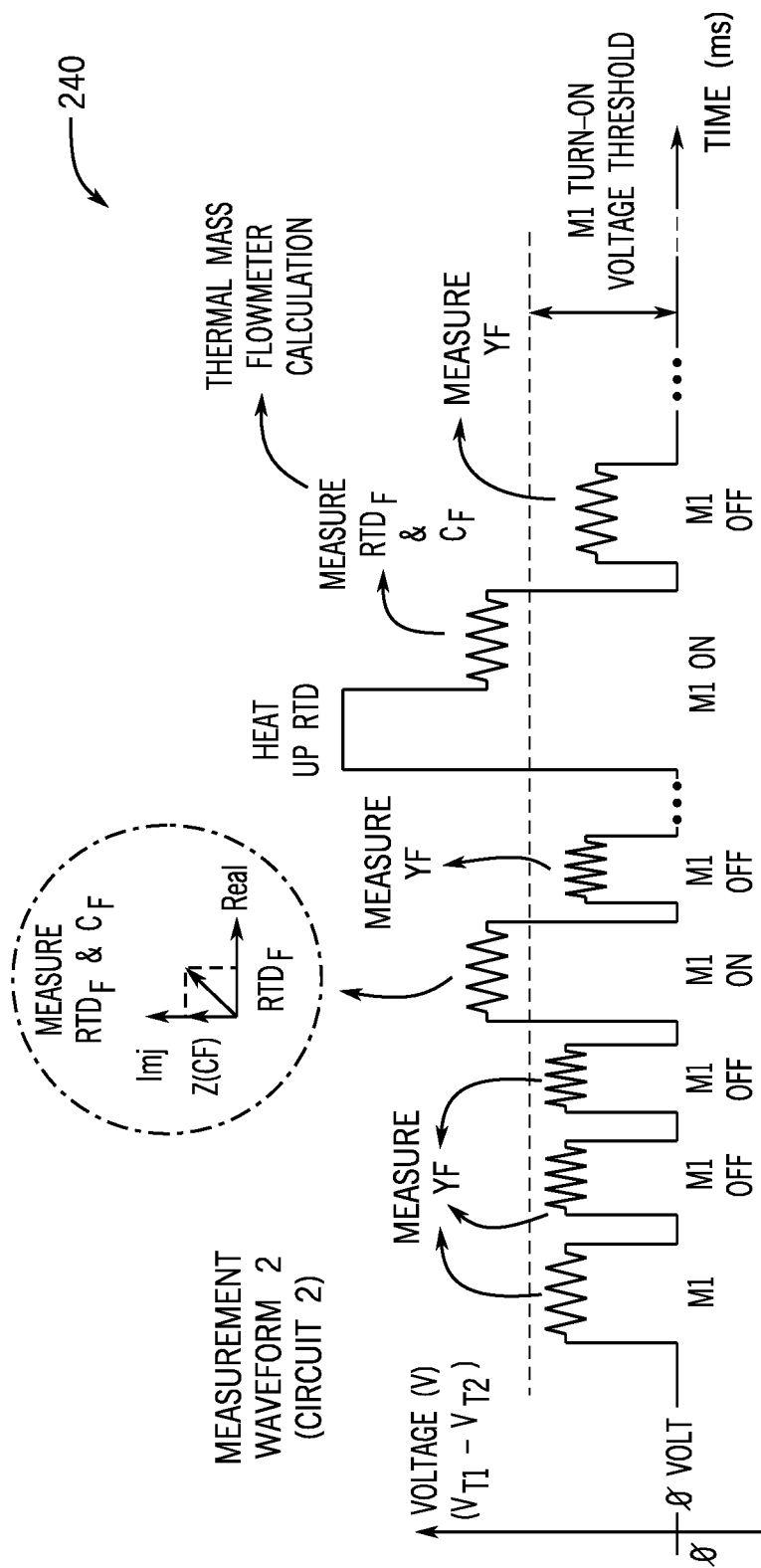
FIG. 11 illustrates a waveform for operation of the circuit of FIG. 10, in accordance with example embodiments.

FIG. 10 illustrates another example embodiment of a circuit 220 that can be used with embodiments of the present disclosure. Instead of diodes, the circuit 220 of FIG. 10 includes a MOSFET 222 (metal-oxide-semiconductor field-effect transistor) for switching between measurements modes. Accordingly, FIG. 11 illustrates a waveform 240 for operation of the circuit of FIG. 10. Other electrical circuit embodiments can be used to combine these multiple sensor measurements over a two-wire connection. $C_f$ plates exposed to the fluid primarily detect the fluid capacitance $C_f$ whose measurements are dependent on the fluid relative permittivity (dielectric constant).

The fluid capacitance $C_f$ measurement reads higher for higher relative permittivity fluid (e.g. water with $\varepsilon_w$=80), and reads lower for lower relative permittivity fluids (e.g. oil with $\varepsilon_{oil}$=2.2 or air with $\varepsilon_{air}$=1), providing indications of the type of fluid present in the production flow line. Some constant fluid independent parasitic capacitance associated with capacitor's plate protective thin layer is present in series with each capacitor plate of the fluid capacitance $C_f$, which can be accounted for during the complex impedance measurement evaluation to extract the $C_f$ from the net imaginary component complex impedance measurement. The fluid temperature sensor $RTD_f$ is a Resistance Temperature Detector (RTD) or optionally with silicon-based MEMS chip for example. The RTD may provide fluid measurements calibration data and complementary thermal conditions of the fluid (e.g. heat capacity evaluation), which affects the density, sonic speed and viscosity piezoelectric helm resonator measurements.

The $RTD_f$ measurement can provide additional measurements such as Thermal Mass Flow. Thermal mass flow indicates the mass flow rate of gases and liquids directly evaluated in a point or sensed area. Mass flow measurements are unaffected by changes in viscosity, density, temperature or pressure. In this type of thermal immersion or immersible type flow meter, the heat is transferred to the boundary layer of the fluid flowing past and over the heated surface (heated directly or indirectly).

In some embodiments, such as in the illustrated embodiment, the electrode 110 extends an electrode length, which is less than the length of the strain bar 98.186. However, it should be appreciated that in various embodiments the length of the electrode may be substantially equal to the length of the strain bar 98. In various embodiments, a surface area of the electrode 110 may determinate, at least in part, a magnitude of an emitted signal. Accordingly, a larger surface area may induce more movement of the piezoelectric helm resonator 90, as well as improve a signal/noise ratio associated with the helm resonator sensor 90. The electrode 110 also includes an electrode height, which is less than a height of the strain bar 98. However, in various embodiments, the heights of the electrode 110 and the strain bar 98 may be substantially equal. It should be appreciated that certain terms such as height, thickness, width, and the like may be used interchangeably to describe various properties of the piezoelectric helm resonator 92. These terms may be interchangeable due to the three dimensional coordinate system and the point of view that the piezoelectric helm resonator 92 is viewed. For instance, a height (substantially up and down relative to the page) may be viewed as a width (substantially left to right relative to the page) based on the perspective at which the piezoelectric helm resonator 92 is viewed.

Figure 12:
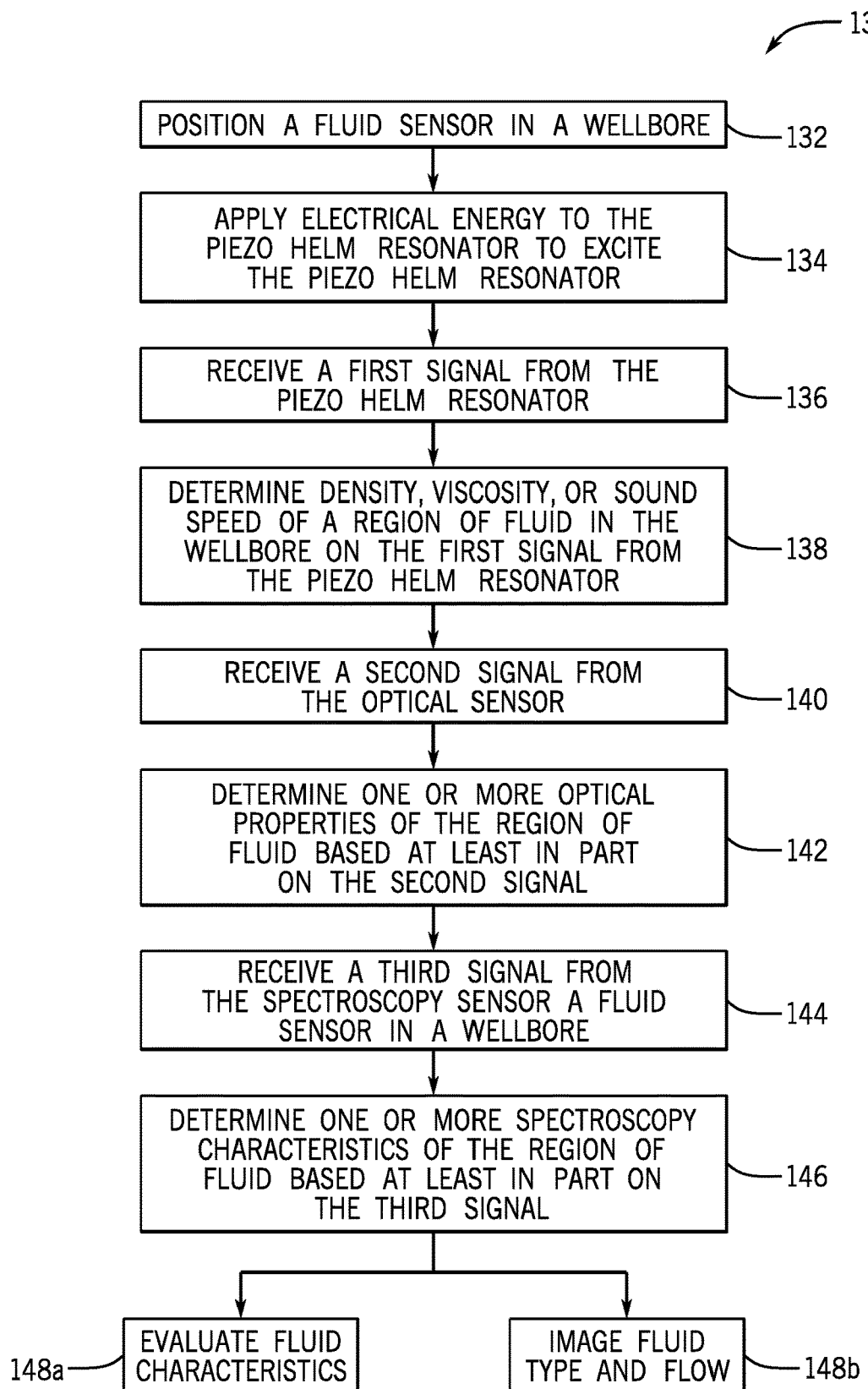
FIG. 12 is a flow chart of an embodiment of a method for collecting and analyzing data utilizing the downhole fluid analysis device, in accordance with example embodiments.

FIG. 12 is a flow chart of an embodiment of a method 130 for collecting and analyzing data utilizing the downhole fluid analysis device 90. It should be understood that, for any process described herein, that there can be additional, alternative, or fewer steps performed in similar or alternative orders, or concurrently, within the scope of the various embodiments unless otherwise specifically stated. The illustrated method 130 includes positioning 132 a fluid sensor in a wellbore, in which the fluid sensor comprising co-located piezoelectric helm resonator, optical sensor, fluid capacitance, resistance temperature detector, thermal mass flow meter and electromagnetic spectroscopy sensor.

The method further includes applying 134 electrical energy to the piezoelectric helm resonator to excite the piezoelectric helm resonator, receiving 136 a first signal from the piezoelectric helm resonator, and determining 138 one or more of density, viscosity, or sound speed of a region of fluid in the wellbore based at least in part the one or more signals from the piezoelectric helm resonator. Multiple fluid sensor time series measurements are acquired over a period of time and in various points spatially distributed around the fluid flow path cross-section inside the tubular. These flow cross-section spatial distributions recorded over a time interval as time series data arrays can be used to construct mass and volume three phase flow imaging, providing a visualization of multiple phase fluid flow patterns and colors indicating fluid characteristics and fluid types flowing inside the tubular.

These multiple phase fluid flow visualizations can be used for reservoir wells production evaluation and diagnostics, leading to intervention, injection stimulus, and remediation procedures required for performing reservoir and well flow assurance program goals. The method also includes receiving 140 a second signal from the optical sensor, determining 142 one or more optical properties of the region of fluid based at least in part on the second signal, receiving 144 a third signal from the spectroscopy sensor, and determining 146 one or more spectroscopy characteristics of the region of fluid based at least in part on the third signal. In some embodiments, various additional interpretive steps can be performed back on the detected information. For example, the method may also include evaluating 148*a* fluid characteristics (e.g., fluid types), and/or imaging 148*b* fluid types and flow in the wellbore or in the tubulars.

In some embodiments, the density, viscosity, sound speed, one or more optical properties, and one or more spectroscopy characteristics are associated with the same fluid domain and time. At least some of these parameters can be used to further estimate other in situ characteristics of the well fluid, including for example, live-oil oil holdup, live-oil gas-oil-ratio, live-oil sound speed, live-oil bulk modulus, live-oil mass density, or dead-oil mass density. In order to make these correlations the measurements for sound speed, acoustic impedance and bulk modulus of the composite fluid flow must be obtained in a specific congruent manner. That is, from a single measurement domain [M-domain] with a sensing field of interaction that is simultaneous and congruent relative to all the acoustic measurements and all the continuous/dispersed particles. The co-located nature of the piezoelectric helm resonator, the optical sensor, and the spectroscopy sensor allows such and other measurements to be made for the same fluid domain and at the time.

In various embodiments, the change in fundamental resonance frequency spectra of the piezoelectric helm resonator that is coupled to a fluid due to changes in the visco-acoustic properties of the local fluid volume. The design of the helm resonator creates a 'self-equilibrated' standing acoustic wave pattern between the opposing resonator tines and develops a localized Helmholtz resonator without the need for an external reactionary cavity wall. This phenomenon allows the sensor to be utilized in a variety of configurations, including the combination of an array of sensors distributed throughout the borehole cross section to analyze multi-phase stratified production flows.

For the production logging applications several design characteristics derive from the fact that the downhole environment for the application involves borehole fluid flows of significant ranges of flow speeds, a broad variety of multi-phase fluid properties to be investigated, and extreme downhole pressures and temperatures. The measurement relies on the resonant excitation of a formed volume of the fluid mixture of interest, and the sensing of the changes in resonance frequency spectra of the electrical admittance response of the sensor with changes in the volume fluid properties. The piezoelectric helm resonator functions by generating a "self-equilibrated" acoustic wave pattern in the resonance formed volume between the two sets of vibratory tines. This phenomenon creates an intrinsic Helmholtz resonator of the fluid volume between the helm tines and allows the sensor to be simply deployed in any open-field fluid domain. This then also ensures the measurement of the fluid is closely representative of the local borehole flow across the sensor.

A complex admittance is measured from the piezoelectric helm resonator over a frequency range, producing frequency dependent curves with corresponding phase and amplitude frequency response or its real and imaginary complex frequency response components. Quantitative numerical features extracted from the piezoelectric helm resonator's real and imaginary complex admittance amplitude and phase frequency dependent curves can be used as parameter inputs to various formulas, threshold detectors, and fluid property discriminators in one, two and three-phase fluid flow. This can be used to produce tubular mass flow and volumetric cross-section image and distribution estimate of fluid density, viscosity and sonic speed, fluid phase detection, fluid type detection, three-phase fluid type change, mixed three-phase fluid detection, mixed two-phase fluid detection, variation statistics or detection thresholds of fluid density, viscosity or sonic speed, increase or decrease of fluid's density, viscosity or sonic speed.

The piezoelectric helm resonator's real and imaginary complex admittance amplitude and phase frequency dependent curves, and any of their derivative curves with respect to frequency can apply their respective calculated quantitative parametric measurements for fluid property and dynamic flow behavior evaluation and mapping with formulas, threshold detectors and discriminators as discussed above. The calculated quantitative parametric measurements of these curves can include for example, but are not limited to, an integral of curve differences computed over a frequency range measured at different times or similarly an integral of difference of separately computed non-overlapping curve window moving averages for example for evaluation and determination of dynamic fluid flow behavior within the tubular. Other calculated quantitative parametric measurements include frequency at the curve's peak values, frequency difference between curve's peaks, curve differential value between positive and negative curve's peak values, frequency interval between curve derivative zero-crossings, parameter computation using the curve's derivative positive and negative peak values or frequencies at peaks (sums or differences for example), maximum curve derivatives with respect to frequency, curve peak frequency width at 50% of the peak value (or width at other chosen peak percent values).

Figure 13:
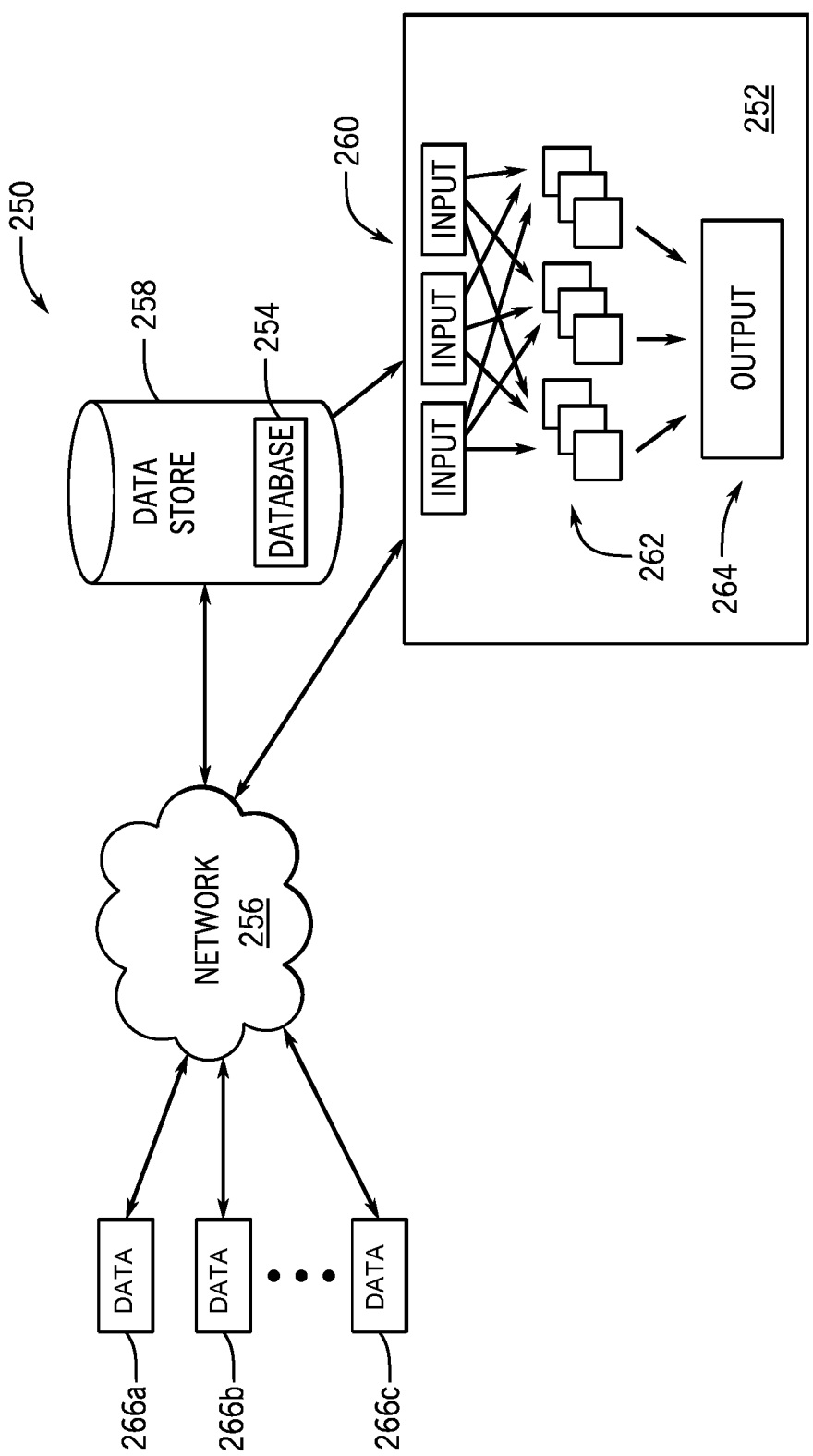
FIG. 13 is a block diagram of an embodiment of a machine learning system that may be utilized with embodiment of the present disclosure, in accordance with example embodiments.

The production logging diagnostic, predictive, or analytical method may use one or more curve frequency dependent values measured or derived from measured curve values. Such values can be measured in one or multiple distributed sensors, at one or different points of time, or over different time intervals. Values can be applied as inputs to formulas, threshold detectors, and discriminators evaluated with a measured or computationally derived curve. Calculated quantitative parametric measurements of the curves can be used for fluid characteristics and properties computation, along with descriptive and analytical statistics in order to evaluate and analyze production logging flow FIG. 13 is a block diagram of an embodiment of a machine learning system 250 that may be utilized with embodiment of the present disclosure. Embodiments of the present disclosure may utilize machine learning techniques to associate specific electromagnetic impedance spectroscopy with specific fluid mixtures, thus enabling not only fluid property identification but fluid mixture characterization. The machine learning techniques may include one or more neural networks (e.g., convolutional neural networks, fully connected neural networks, recurrent neural networks, etc.) to analyze how data related to electromagnetic impedance spectroscopy may relate to ground truth information related to fluid mixture characterization. In other words, the machine learning method may obtain information identifying fluid mixture characterizations based on electromagnetic impedance spectroscopy (e.g., a ground truth) and thereafter "learn" how different electromagnetic impedance spectroscopy information may correlate to that fluid characterization, as well as others. In certain embodiments, the machine learning techniques may incorporate one or more open source machine learning libraries, such as TensorFlow, scikit-learn, Theano, Pylearn2, NuPIC, and the like.

It should be appreciated that in certain embodiments the machine learning system 250 may be incorporated into a control system associated with the wireline/drilling system 20. The control system may include one or more processors and memories. The memories may store instructions that, when executed by the processors, perform one or more functions. Additionally, in embodiments, the machine learning system 250 may be associated with a remote server having a processor (e.g., central processing unit, graphics processing unit, etc.) and a memory. In the illustrated embodiment, the machine learning system 250 includes a machine learning module 252 that may be trained using known information (e.g., a ground truth) such as a database 254. In this training step, the machine learning module 252 is utilized to correlate data between fluid mixtures and their associated electromagnetic impedance spectroscopy. It should be appreciated that the machine learning module 252 may be trained using any variety of methods, such as back propagation, clustering, or any other reasonable methods.

As shown in FIG. 23, data (e.g., 266a, 266b, 266c) from the fluid analysis tool 40 may be transmitted to a network 256, for example via a network communication system, such as the Internet or the like. The network 256 may include the database 254 and/or be in communication with the database 254, which may be stored in a data store 258 which can be a cloud storage architecture accessible by multiple data sources supplying sensorial data remotely scattered and users client base via an internet network. The data store 258 may be utilized for training purposes for the supervised or unsupervised machine learning module 252 or to transmit data to the machine learning module 252 for evaluation. It should be appreciated that data may also be transmitted directly to the machine learning module 252 from the network 256.

The illustrated embodiment of the machine learning module 252 includes a convolutional neural network that takes input 260 through one or more convolutional steps 262, which may include pooling, non-linearization (e.g., ReLu), filtering, and the like. The result of the convolutional steps 262 may be further processed to from an output 264 based on one or more parameters of the machine learning module 252. For instance, if the machine learning module 252 is trained to identify fluid mixture properties, such as a percentage of drilling mud in the fluid, then the machine learning module 252 may output information indicative of different percentages of fluids within the fluid cavity, a predefined characterization (e.g., mud-heavy, mud-light, etc.), or a percentage of mud. In certain embodiments, this may be referred to as identification of the contamination of the fluid.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A downhole fluid analysis device, comprising:
   a piezoelectric helm resonator comprising:
      a strain bar comprising a first side, a second side opposite the first side, a first end, and a second end opposite the first end;
      a pair of electrodes, wherein a first electrode of the pair of electrodes is positioned on the first side and a second electrode of the pair of electrodes is positioned on the second side; and
      a pair of tines, wherein a first tine of the pair of tines is coupled to the first end and a second tine of the pair of tines is coupled to the second end, the pair of tines each having an arc, wherein strain across a transverse face of the strain bar generates a resonance response from the pair of tines;
   an optical sensor co-located with respect to the piezoelectric helm resonator; and
   a spectroscopy sensor co-located with respect to the piezoelectric helm resonator.

2. The device of claim 1, wherein the pair of electrodes each comprise a sensor portion extending away from the strain bar and forming a portion of the spectroscopy sensor.

3. The device of claim 1, wherein the spectroscopy sensor comprises at least one electromagnetic spectroscopy coil located on at least one of the pair of electrodes.

4. The device of claim 1, wherein the piezoelectric helm resonator comprises a centrally located orifice formed therein, and wherein the optical sensor is positioned at least partially through or aligned with the orifice.

5. The device of claim 1, further comprising:
   a coaxial connection interface comprising an electrical channel and an optical channel, the electrical channel electrically coupled to the pair of electrodes and the optical channel optically coupled to the optical sensor.

6. The device of claim 1, further comprising:
a connection interface comprising a channel coupled to the piezoelectric helm resonator and the spectroscopy sensor, wherein the channel carries an acoustic signal generated by the piezoelectric helm resonator and an electrical signal generated by the spectroscopy sensor.

7. The device of claim 1, wherein the pair of electrodes are coupled to an electric circuit comprising a signal coupling or tuning device.

8. The device of claim 1, further comprising:
a flow meter comprising a resistance thermometer detector.

9. A downhole fluid analysis system, comprising:
a plurality of arms movable from a retracted position into an expanded position, each arm comprising one or more fluid sensors, at least one of the fluid sensors comprising:
a piezoelectric helm resonator comprising:
a strain bar comprising a first side, a second side opposite the first side, a first end, and a second end opposite the first end;
a pair of electrodes, wherein a first electrode of the pair of electrodes is positioned on the first side and a second electrode of the pair of electrodes is positioned on the second side; and
a pair of tines, wherein a first tine of the pair of tines is coupled to the first end and a second tine of the pair of tines is coupled to the second end, the pair of tines each having an arc, wherein strain across a transverse face of the strain bar generates a resonance response from the pair of tines;
an optical sensor co-located with respect to the piezoelectric helm resonator; and
a spectroscopy sensor co-located with respect to the piezoelectric helm resonator in at least one direction.

10. The system of claim 9, wherein the plurality of arms are fixed at opposing ends and bendable at least one location between the opposing ends, wherein the plurality of arms are arranged about a central axis, and wherein the plurality of arms expand away from the central axis to position into the expanded position and contract towards the central axis to position into the retracted position.

11. The system of claim 9, wherein at least one of the plurality of arms comprises a flow spinner located thereon.

12. The system of claim 9, wherein the at least one fluid sensor is movable from a stored position to a deployed position relative to a respective arm on which the at least one fluid sensor is located.

13. The system of claim 12, wherein the at least one fluid sensor is coupled to the respective arm via a pivot and configured to swing away from the respective arm towards a central axis of the system.

14. The system of claim 12, wherein the at least one fluid sensor is coupled to the respective arm via a pivot and configured to swing away from the respective arm to the side in a direction tangential to a central axis of the system.

15. The system of claim 12, wherein in the deployed position, the at least one fluid sensor is at an angle with ±5 degrees from an axis of a borehole in which the system is positioned.

16. The system of claim 12, wherein the one or more fluid sensors are individually addressable.

17. A method of obtaining fluid properties in a well, comprising:
positioning a fluid sensor in a wellbore, the fluid sensor comprising co-located piezoelectric helm resonator, optical sensor and electromagnetic spectroscopy sensor;
applying electrical energy to the piezoelectric helm resonator to excite the piezoelectric helm resonator;
receiving a first signal from the piezoelectric helm resonator;
determining one or more of density, viscosity, or sound speed of a region of fluid in the wellbore based at least in part the first signal from the piezoelectric helm resonator;
receiving a second signal from the optical sensor;
determining one or more optical properties of the region of fluid based at least in part on the second signal;
receiving a third signal from the spectroscopy sensor; and
determining one or more spectroscopy characteristics of the region of fluid based at least in part on the third signal.

18. The method of claim 17, wherein the density, viscosity, sound speed, one or more optical properties, and one or more spectroscopy characteristics are associated with the same fluid domain and time.

19. The method of claim 17, further comprising:
determining an in situ estimation of at least one of live-oil oil holdup, live-oil gas-oil-ratio, live-oil sound speed, live-oil bulk modulus, live-oil mass density, or dead-oil mass density.

20. The method of claim 17, further comprising:
receiving the first signal, second signal, and third signal via a coaxial connection an electrical channel and an optical channel, the electrical channel carrying in the first signal from the piezoelectric helm resonation and the third signal from the spectroscopy sensor, and the optical channel carrying the second signal from the optical sensor.

* * * * *